C. W. HEATH.
MEANS FOR TEMPERATURE EQUALIZATION IN GAS ANALYZERS.
APPLICATION FILED AUG. 8, 1919.

1,366,382.

Patented Jan. 25, 1921.

C. W. HEATH.
MEANS FOR TEMPERATURE EQUALIZATION IN GAS ANALYZERS.
APPLICATION FILED AUG. 8, 1919.
1,366,382.
Patented Jan. 25, 1921.
3 SHEETS—SHEET 2.
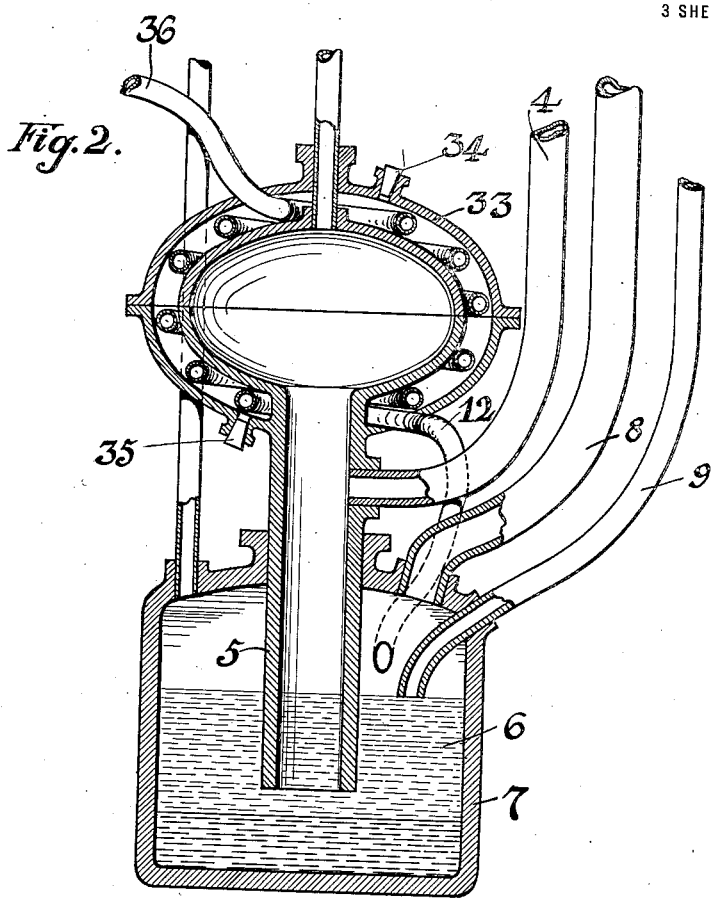
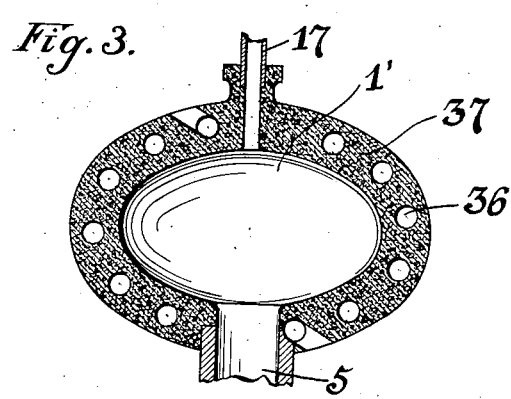

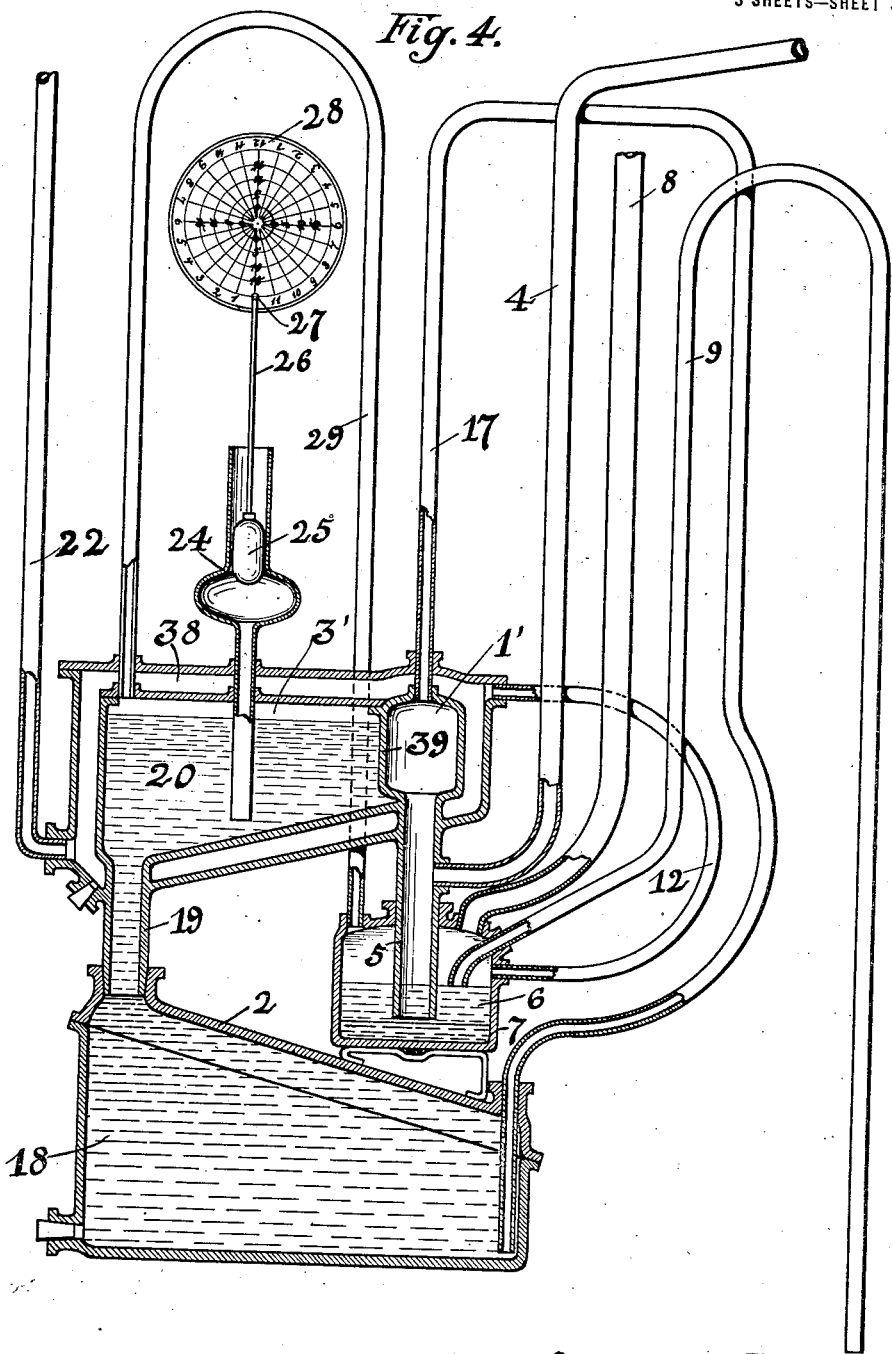
C. W. HEATH.
MEANS FOR TEMPERATURE EQUALIZATION IN GAS ANALYZERS.
APPLICATION FILED AUG. 8, 1919.
1,366,382.
Patented Jan. 25, 1921.

UNITED STATES PATENT OFFICE.

CHARLES W. HEATH, OF CINCINNATI, OHIO.

MEANS FOR TEMPERATURE EQUALIZATION IN GAS-ANALYZERS.

1,366,382. Specification of Letters Patent. Patented Jan. 25, 1921.

Application filed August 8, 1919. Serial No. 316,231.

*To all whom it may concern:*

Be it known that I, CHARLES W. HEATH, a citizen of the United States, and a resident of Cincinnati, in the county of Hamilton and State of Ohio, have invented certain new and useful Improvements in Means for Temperature Equalization in Gas-Analyzers, of which the following is a specification.

My invention relates to means for equalizing the temperature in gas analyzing apparatus in which successive charges of gas are analyzed. Its object is to insure greater accuracy in the measurements, to simplify and cheapen the construction and operation of the apparatus as well as to render it more efficient and reliable, less subject to derangement and more convenient for use, and to obtain the desired result of equalizing the temperature in the first and second measuring chambers without controlling the temperature of the body of absorbent material, since it is unnecessary to control the temperature of the body of absorbent material when the first and final measurements of the gas are both made at the same temperature.

In the drawings:

Fig. 2 is an enlarged vertical sectional elevation of the first measuring vessel and part of my invention therewith, showing a modification;

Fig. 3 is a vertical section corresponding to Fig. 2, showing another modification; and Fig. 4 is another view similar to Fig. 1, showing a modification of the apparatus.

Figure 1:
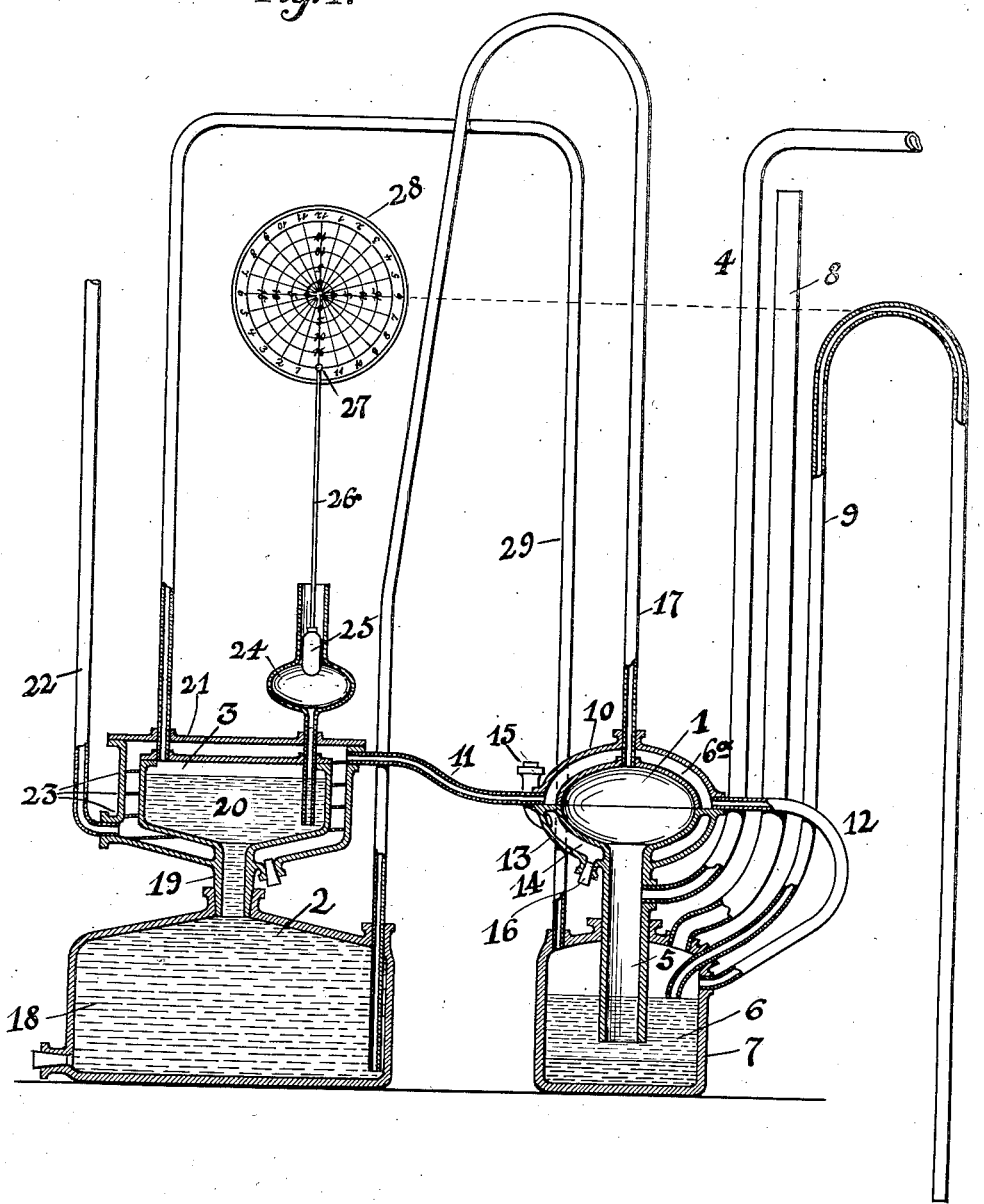
Figure 1 is a diagrammatic vertical sectional elevation of apparatus embodying my invention.

Heretofore the methods for equalizing temperatures in automatic gas analyzers have been either more or less complicated, or have employed bulky water baths in which the greater part of the analyzer was submerged, or else small jackets covering certain parts of the analyzer have been employed and a stream or streams of water allowed to flow through these jackets.

In my present invention is embodied the means for allowing of the construction of an automatic gas analyzer, in which temperature controlling means are employed of compact and more practical construction than where it has been necessary to use the large water bath mentioned and, I have also found that my present invention is considerably more reliable than where small water jackets covered certain parts of the analyzer in which the temperature of the water in the water jacket was intended to keep the temperature in the various jacketed parts at equal temperature at all times regardless of how the temperature of some parts of the analyzer might tend to vary due to any of the common causes of temperature variation in gas analyzers.

In any case heretofore, it has been most difficult to keep an automatic gas analyzer showing an approximately correct reading where temperatures varied considerably in either the gas to be analyzed, in absorbent solutions, the surrounding atmosphere, or operating liquids, as is commonly found in practice.

The reason for this is because, in some cases, the absorbent solution temperature had to be kept equalized with the rest of the apparatus, and this is usually of sufficient bulk that it is difficult to change its temperature as rapidly as is necessary to keep pace with the temperature changes of liquids or gases in other parts of the apparatus. In other cases where the small jackets mentioned have been used, these jackets surround some measuring vessels normally filled with a liquid and other measuring vessels which, normally, do not contain liquid. The vessels' temperatures are changed more quickly when they do not contain a liquid. Owing to this there has been more or less difficulty in realizing temperature equalization where some of these common causes of temperature variation occur frequently as they generally do in some kinds of gas analysis work, such, for instance, as in boiler room work when the analyses of furnace gases are automatically made and recorded. In such cases of work the analyzers are usually inaccurate a considerable portion of the time due to the slowness of the temperature changes in some parts of the apparatus as compared to others.

This objection I have greatly overcome by employing a new means whereby the temperature of certain parts is kept equalized better than has been possible by the means heretofore used.

Nearly all automatic gas analyzers employ at least two measuring devices and an absorption vessel. In most of these, a first measuring device measures off a sample of the gas to be analyzed. This measured sample is then passed through the absorption vessel where a constituent of the gas is absorbed. The residue, or unabsorbed part of the gas is then measured in a second measuring device where means are provided for showing the amount of gas that was absorbed.

It is important that the gas in the second measuring device be at the same temperature that it was at the time of being measured in the first measuring device, otherwise an objectionable error will occur due to contraction or expansion of the gas. However, the gas may be raised or lowered in temperature while passing through the absorption vessel without affecting the accuracy of the test as long as the unabsorbed portion of the gas when in the second measuring device is again brought to the temperature at which it was first measured.

In my improved method of temperature equalization, I do not attempt to change the temperature of the absorption vessel or its contents or to control the temperatures of them in any way. I prefer to confine the temperature equalizing process to the measuring devices alone, as quicker and more satisfactory results are obtained.

Since a body of liquid is commonly used in the second measuring device, the temperature of this second measuring device and its contained liquid has a tendency to change more slowly than does the temperature of the first measuring device which contains very little, if any liquid, while the gas is being measured therein.

In the present invention, I employ means for causing the gas measuring space in the first measuring device to not change temperature any more rapidly than it is possible to change the temperature of the second measuring device, and its contained liquid. This is accomplished by providing a jacket of flowing liquid around the second measuring device and a combined jacket of flowing and non-flowing contents around the first measuring device or vice versa, according to the construction of the analyzer employing the system. These jackets are shown in Figs. 1, 2 and 3 of the drawings. In Fig. 4 is shown the same principle, but in this case, the liquid contained in the second measuring device is itself used to act as the non-flowing part of the jacket for the first measuring device. This liquid moves around somewhat in the second measuring device, yet it does not flow past the first measuring device, in a stream and then not return, as does the jacket of flowing liquid.

In any of these examples, the function of the flowing or changing liquid or other medium is to equalize the temperatures of the two measuring devices or chambers. I therefore term this an equalizing medium or equalizer. The function of the non-flowing or non-changing liquid or other medium is to compensate for the variation of the relative heat-retaining capacities or other temperature-maintaining conditions of the two devices or chambers. This is therefore termed a compensating means. It is by the coaction of this compensating means with the equalizing means that the efficiency of the latter as an equalizer is increased, so that its function of equalization of temperatures of the two devices is more perfectly accomplished.

The construction of my new temperature equalizing device in conjunction with an automatic gas analyzer is shown in Fig. 1 wherein is shown a first measuring chamber 1, an absorption vessel 2 and a second measuring chamber 3. A gas inlet pipe 4 leads from a source of supply and communicates with a tube 5 which leads downwardly from said first measuring chamber 1 into a liquid 6 in a liquid vessel 7. A vent tube 8 communicates with this liquid vessel and extends upwardly to a point higher than the upper bend in a siphon tube 9 which also extends into the liquid vessel 7 from where it is carried upwardly to a point of proper height for the satisfactory operation of the analyzer and from which point it bends downwardly and extends below the liquid vessel 7. The upper part of the first measuring chamber 1 is surrounded by a jacket casing 10 so arranged that liquid $6^a$, of the same kind as shown in the liquid vessel 7, at 6 is permitted to flow over and in contact with the upper part of the first measuring chamber 1. This liquid enters the jacket casing 10 from a pipe 11 and leaves said casing through a pipe 12 through which it is carried to the liquid vessel 7 and becomes a part of the liquid 6.

The lower part of the measuring chamber 1 is surrounded by another jacket casing 13 in which may be installed a body of liquid 14 which is supposed to remain in contact with the lower portion of the first measuring vessel 1. A filling plug 15 and drain plug 16 may be provided in the jacket casing 13 if liquid be used for jacketing the lower portion of the first measuring vessel 1. It is not necessary to use liquid for jacketing the lower portion of vessel 1 as any suitable material may be used. Also the positions of the jacket for flowing liquid $6^a$ and of the other jacket 14 may be reversed or any combination or arrangement of these jackets may be employed, and I do not wish to be limited to the construction shown.

A gas discharge pipe 17 communicates with the first measuring chamber 1 and leads to the absorption vessel 2 which it enters and terminates near the bottom thereof. The absorption vessel 2 is preferably filled with an absorbent liquid 18. A neck 19 connects the absorption vessel 2 with a second measuring chamber 3. This second measuring chamber 3 and neck 19 contain an oil 20 which floats on the top of the absorbent liquid 18. A jacket casing 21 surrounds the second measuring chamber 3. A liquid supply pipe 22 affords means whereby liquid 6ᵃ is forced in a continuous stream into the space between the jacket casing 21 and second measuring chamber 3. Baffle plates 23 cause this liquid 6ᵃ to flow around on all sides (top and bottom) of the second measuring chamber 3 and prevent short circuiting of said liquid. This liquid 6ᵃ leaves the jacket casing 21 through the pipe 11.

A float tube 24 of varying diameters extends downwardly into second measuring chamber 3 where its lower end is at all times covered by the oil 20. A float 25 extending into the enlarged portion of the float tube 24 supports a pen arm 26 and pen 27 in such a manner that any movement of the float is recorded on the surface of a chart 28 which may be rotated by clock-movement or other means which are not shown since they do not form a part of the present invention. One end of a residue outlet tube 29 communicates with the second measuring vessel 3 at a point above the surface of the oil 20 and the other end extends into the liquid vessel 7.

The operation of such an analyzer as shown in connection with my new means for temperature equalization of the first and second measuring chambers, is as follows:

A stream of water or other liquid flows from a source of supply through liquid supply pipe 22, jacket casing 21, pipe 11, jacket casing 10 and pipe 12 into the liquid vessel 7, where it forms the liquid body 6. This water is supposed to flow constantly. As it rises in the liquid vessel 7 above the position shown in the drawing, it begins to rise also in the tube 5 and siphon tube 9. As it continues to rise it will seal the opening of residue outlet tube 29 and will rise in vent tube 8. While this takes place, any air or residue gas in liquid vessel 7 is exhausted through vent tube 8 and some of the gas in tube 5 is exhausted through gas inlet pipe 4. While the liquid continues to rise in tube 5, gas from tube 5 will continue to be exhausted through gas inlet pipe 4 until the liquid has risen high enough to seal the mouth of gas inlet pipe 4 where it communicates with tube 5. Any gas in first measuring chamber 1 and the small amount that remains in tube 5 above the mouth of pipe 4, now constitute the measured sample to be analyzed. As liquid continues to flow into vessel 7, it presses up through tube 5 compressing the measured gas sample in measuring chamber 1. The only avenue of escape for this measured gas sample being through gas discharge pipe 17, it follows that this measured sample will eventually practically all be discharged through discharge pipe 17 into the absorbent solution 18 in absorption vessel 2 at a point near the bottom thereof. The gas from there rises in the form of bubbles up through said solution 18 and absorption of a constituent of the gas is effected thereby. An example of this would be, where gases from a furnace were passed up through a strong solution of caustic potash in water, the carbon dioxid constituent in the gases would be absorbed. The residue, or unabsorbed portion of the gases, passes up through the oil 20 located in neck 19 and in the second measuring chamber 3. Since the mouth of the residue outlet tube 29 has been sealed by the liquid 6 in vessel 7, the residue cannot, for the time being, escape from the second measuring chamber 3, but presses down on the surface of the oil 20 thereby forcing some of it up into the float tube 24. The more residue there is, the higher will the oil be forced up into the float tube 24, and vice versa. The float 25, by aid of the pen arm 26 pushes the pen 27 up on the surface of the chart 28, a distance equal to the distance that the float was raised by the oil in float tube 24. Thus, a record is made, in a well known manner, on the chart 28 and the height to which the pen 27 rises, indicates whether more or less residue or unabsorbed gas, passed through the absorbent 18 and pressed upon the surface of this oil 20. This in turn gives the information desired regarding what proportion of the measured gas sample was actually absorbed by the absorbent solution 18. The solution being of sufficient strength to absorb all of the constituents of the gas sample that it is intended to absorb, the amount of said constituents originally contained in the measured sample may be thereby known. By the time the pen 27 has reached the highest point it will travel in the present analysis, the first measuring chamber 1 will be filled with the liquid 6. The liquid will have risen also in pipes 4, 8 and 9 as high as the bend at the highest part of siphon tube 9. As the liquid tends to rise higher, it will overflow through siphon tube 9, starting a siphonic action therein which soon empties all pipes, vessels, chambers and tubing of liquid down to the position shown in the drawing when the siphon automatically stops operating until the liquid again, in the course of the completion of another analysis, rises to the bend in siphon tube 9, and begins to overflow through same. During the siphoning out process, the residue from the second measuring chamber 3, owing to the pressure of the head of oil in float tube 24, is pushed through residue outlet tube 29 into vessel 7, and passes from there to the atmosphere through vent tube 8. When liquid 6 uncovers the mouth of residue outlet tube 29 in vessel 7, the space above the oil 20 in measuring chamber 3 resumes atmospheric pressure and the oil drops down in float tube 24 to the same level as it is in measuring chamber 3. Also, while the siphon is in operation, the liquid 6 flows down out of first measuring chamber 1 and gas enters through inlet pipe 4 to take its place and be measured and analyzed as described above.

The importance of measuring the residue in the second measuring chamber 3 at the same temperature at which the gas sample was measured in the first measuring chamber 1, so as to eliminate error due to contraction or expansion of the residue due to temperature change has been mentioned above. This temperature equalization is accomplished in the following manner:

The liquid $6^a$ or equalizing medium forms a flowing liquid jacket around the second measuring chamber 3 and were it not for the body of oil 20 which is advantageously used therein as a measuring medium, the temperature of any gas contained above the oil would rapidly change as often as the temperature of the jacket liquid $6^a$ would change. However, the oil 20, which remains in contact with the residue, does not, in practice, usually change its temperature rapidly enough to allow the residue temperature to change as rapidly as does at times the gas sample temperature in the first measuring chamber 1, when a flowing liquid jacket surrounds the first measuring chamber, as has been done heretofore, and where this liquid is liable to change temperature as usually happens more or less frequently. I am able to overcome this objection by contacting the vessel or device which does not at all times normally contain liquid, (which in the present case is the first measuring chamber 1) with a compensating means or body of quiet liquid or other suitable material of such size that temperature change in the first measuring chamber 1 is retarded so that it is equal to the retardation of temperature change in the second measuring chamber 3, due to the presence of the oil 20. In this manner the same influences for changing temperature and also for retarding temperature change in both measuring vessels are balanced so that greater accuracy in the operation of an automatic gas analyzer is obtained thereby.

In Fig. 2 I have illustrated a modified construction in which the various parts are the same as shown in Fig. 1 except that the jacket 33 for the first measuring chamber 1 extends around said chamber and is not separated into upper and lower divisions or compartments. In this construction, the jacket is filled with compensating liquid, such as water, through opening 34, and remains still or non-flowing while used therein.

When desired, it may be discharged through outlet 35. A tube 36 for the flowing equalizing liquid from tube 11 is coiled around the first measuring chamber 1 in said jacket 33 and leads therefrom downwardly into liquid chamber 6.

Fig. 3 represents another modification of the jacket or compensating means of the first measuring chamber 1, said jacket being filled with a non-liquid such as a body of metal 37 of suitable dimensions and the flowing liquid tube 36 carrying the equalizing medium extends therethrough in coiled formation.

Another modification of my invention is illustrated in Fig. 4, and shows a more compact arrangement of parts. In this construction the first measuring chamber 1' and the second measuring chamber 3' are surrounded by a common flowing or equalizing liquid jacket 38. and one wall of the first measuring chamber also forms the wall of the second measuring chamber so that the oil 20 compensates directly, but otherwise the construction is substantially the same as that illustrated in Fig. 1.

The operation of the device when using the construction shown in Figs. 2, 3 and 4 is substantially the same as when using the construction shown in Fig. 1.

While I have shown and described my invention as applied to automatic gas analyzers it may also be applied to other gas analyzers, such as hand operated and while the constructions herein illustrated and described are desired embodiments of my invention, it will be understood that variations thereof which fall within the definitions of the following claims may be employed without departing from the scope of my invention.

I claim—

1. In a gas-analyzer comprising a plurality of gas-measuring chambers in which the temperature-maintaining conditions are relatively variable, means for conducting a temperature-equalizing medium past and in proximity to the exteriors of all of said chambers, and means to compensate for the relative variation of the temperature-maintaining conditions of said chambers.

2. In a gas-analyzer comprising a plurality of gas-measuring chambers in one of which the temperature-maintaining conditions are variable, means for conducting a temperature-equalizing medium past and in proximity to the exteriors of all of said chambers, and means to compensate for the variation of the temperature-maintaining conditions of said one of said chambers.

3. In a gas-analyzer comprising a plurality of gas-measuring chambers in which the heat-retaining capacities are relatively variable, means for conducting a temperature-equalizing medium past and in proximity to the exteriors of all of said chambers, and means to compensate for the relative variation of the heat-retaining capacities of said chambers.

4. In a gas-analyzer comprising a plurality of gas-measuring chambers in one of which the heat-retaining capacity is variable, means for conducting a temperature-equalizing medium past and in proximity to the exteriors of all of said chambers, and means to compensate for the variation of the heat-retaining capacity of said one of said chambers.

5. In a gas-analyzer comprising a plurality of gas-measuring chambers, one of which has a substantially constant heat-retaining content, and the other of which has a variable heat-retaining content, a transient temperature-equalizer for both of said chambers, and means to compensate for the variation in the chamber having the variable heat-retaining content.

6. In a gas-analyzer comprising a plurality of gas-measuring chambers and a gas-absorbent, one of which chambers has a substantially constant heat-retaining content, and the other of which chambers has a variable heat-retaining content to force gas through said gas-absorbent into said one of said chambers with said substantially constant heat-retaining content, a transient temperature equalizer for both of said chambers, and means to compensate for the variation in the chamber having the variable heat-retaining content.

7. In a gas analyzer, a first gas measuring means, means for extracting one or more constituents from a measured quantity of gases, a second gas measuring means for measuring the part of said gases not extracted by said extracting means and temperature equalizing means for said first gas measuring means and said second gas measuring means, consisting of a substance adapted to flow in proximity to both of said gas measuring means and a substance remaining substantially fixed in proximity to one of said gas measuring means.

8. In a gas analyzer, a first gas measuring means, means for extracting one or more constituents from a measured quantity of gases, a second gas measuring means for measuring the part of said gases not extracted by said extracting means and temperature equalizing means for said first gas measuring means and said second gas measuring means consisting of a substance adapted to flow in proximity to both of said gas measuring means and a substance remaining substantially fixed in proximity to one of said gas measuring means, said fixed substance being used for the purpose of counterbalancing the temperature-change-retarding influence of any substance used in the operation of the analyzer in proximity to the other of said gas measuring means.

9. A gas analyzer comprising gas measuring chambers and a gas absorption vessel, means for forcing gas to be analyzed from a first of said measuring chambers through said absorption vessel into a second of said measuring chambers, a temperature equalizing means for said chambers consisting of a flowing body for said second measuring chamber, and a flowing body and a non-flowing body for said first chamber.

10. In a gas analyzing apparatus, a gas measuring chamber having a jacket formed into compartments, one of said compartments having an inlet and outlet for a flowing liquid, liquid for said compartment, means for causing liquid to flow through said compartment, and another of said compartments containing a substance which is not caused to flow.

11. A gas-analyzer comprising two gas-measuring devices and temperature-equalizing means in operative proximity to both of said devices, one of which devices inherently changes its temperature more rapidly than the other, and means to compensate for the difference in rate of temperature variation of said devices.

12. In a gas-analyzer, a first gas-measuring means, means for extracting a constituent from a measured mixture of gases, a second gas-measuring means for measuring the unextracted part of said gases, means for transferring the mixture from said first to said second measuring means, a substance adapted to flow past both of said measuring means and in proximity thereto, and another substance adapted to remain in proximity to one of said measuring means so that the temperature change in said one of said measuring means may be retarded in accordance with the retardation of temperature change in the other one of said measuring means.

CHARLES W. HEATH.

Witnesses:
  JAMES N. RAMSEY,
  MARY E. McCONNELL.